United States Patent [19]

Gottwald et al.

[11] 3,862,951

[45] Jan. 28, 1975

[54] 2'QUINOLDINYL GLYCEROL COMPOUNDS

[75] Inventors: Ken Gottwald, Redwood City; Terry Burkoth, Palo Alto; Edwin F. Ullman, Atherton, all of Calif.

[73] Assignee: Syva Company, Palo Alto, Calif.

[22] Filed: Sept. 5, 1972

[21] Appl. No.: 286,520

Related U.S. Application Data

[63] Continuation-in-part of Ser. No. 177,901, Sept. 2, 1971, abandoned.

[52] U.S. Cl...... 260/289 R, 260/250 A, 260/250 C, 260/250 Q, 260/250 R, 260/251 Q, 260/256.4 F, 260/283 R, 260/340.3, 260/618 R, 424/59
[51] Int. Cl............................................. C07d 33/38
[58] Field of Search.................. 260/289, 250 Q, 424/59

[56] References Cited
UNITED STATES PATENTS

| | | | |
|---|---|---|---|
| 2,858,315 | 10/1958 | Matter | 260/289 |
| 3,177,120 | 4/1965 | Black et al. | 167/90 |
| 3,514,411 | 5/1970 | Kolobielski | 252/148 |

FOREIGN PATENTS OR APPLICATIONS

| 163,587 | 6/1958 | Sweden | 424/59 |
|---|---|---|---|

OTHER PUBLICATIONS

Osborne, et al. Journal of the Society of Cosmetic Chemists June 1961, pp. 271-279 (see only p. 273,274).

Miboch, et al. Archives of Dermatology, 82, 73/505 (1960).

Runge, J. of Investigative Dermatology 1962, 431, (1962).

Laden, J. Soc. Cosmetic Chem. 16, 777 (1965).

Stermitz, J.A.C.S. 92, 1446-1448.

Baggett, J. Chem. Soc. 1960, p. 2574.

Hammick, J. Chem. Soc. 1923, 2882.

Hammick, J. Chem. Soc. 1926, p. 1302.

Simon, Chem. Berichte 98, 3692 (1965).

*Primary Examiner*—Donald G. Daus
*Assistant Examiner*—Ralph D. McCloud

[57] ABSTRACT

Azaheterocycles are provided for protection against erythema, either by providing a sunscreen or by providing a sunscreen in combination with a functionality which on exposure to light produces a tanning agent, e.g., dihydroxyacetone. Particular compounds are substituted quinolines.

In addition, other heterocyclic compounds are provided which produce dihydroxyacetone or derivatives thereof on exposure to light to act as staining agents, e.g., substituted benzodioxanes.

2 Claims, No Drawings

2′QUINOLDINYL GLYCEROL COMPOUNDS

CROSS REFERENCES TO RELATED APPLICATIONS

This application is a continuation-in-part of U.S. application Ser. No. 177,901, filed Sept. 2, 1971, now abandoned.

BACKGROUND OF THE INVENTION

1. Field of the Invention

Sunscreen compounds find wide use for prophylactic and cosmetic reasons. Erythema is uncomfortable, and on prolonged exposure to sunlight, is inevitable unless care is taken to protect the skin from the wavelengths of sunlight which produce erythemal response.

Sunscreen compositions are carefully formulated to enhance the retention of the sunscreen compound on the skin. Nevertheless, sweating, swimming, and contact with sand, blankets, and towels, require continuous reapplication of the sunscreen compound in order to provide effective protection. It is therefore desirable, to provide compounds, which in themselves, and when properly formulated, provide enhanced retention to the skin.

Furthermore, the lower the effective concentration required for providing protection, the more efficient will be the sunscreen. Thus, by being efficient, a sunscreen may retain effectiveness for a longer period of time as it is incrementally removed from the skin.

In addition, there are concerns with sunscreens about carcinogenicity, eye inflammation, ease of formulation, stability to light and heat, and the like.

Besides obtaining a natural tan, many people employ artificial tanning agents. While dihydroxyacetone is the skin tanning agent of commercial choice, it has many deficiencies. Prominent among them is the yellow pigmentation that is provided rather than natural red-brown. Also, the color produced by dihydroxyacetone depends upon the thickness and compactness of the stratum corneum. As a result, palms, soles, elbows and knees stain most heavily, while senile skin takes on a mottled appearance. Newly shaven skin appears streaked. In addition, the tan resulting from dihydroxyacetone is not highlighted like the one, one obtains naturally.

Despite the additional shortcomings of dihydroxyacetone, such as its chemical instability, as a result of its sensitivity to acid or base, difficulties in formulation, and the inadequacies of the resulting pigmentation, dihydroxyacetone has still found widespread commercial exploitation.

2. Description of the Prior Art

A number of articles have described the use of dihydroxyacetone, by itself, or in combination with other compounds. See, for example, Maibach, et al., Archives of Dermatology, 82, 73/505 (1960); Runge, et al., J. of Investigative Dermatology 1962, 431; Laden, et al., J. Soc. Cosmetic Chemists, 16, 777 (1965); and U.S. Pat. No. 3,177,120. For the photochemistry of quinoline derivatives, see Stermitz, et al, J. Am. Chem. Soc. 92, 275 (1970).

See also copending U.S. application Ser. Nos. 71,782, 71,783, filed Dec. 14, 1970, both now abandoned.

SUMMARY OF THE INVENTION

Substituted azaheterocycles, particularly polyoxy substituted azaheterocycles, e.g., polyhydroxy substituted quinolines, are employed as sunscreens. The compounds absorb light having wavelengths in excess of 280 nm so as to provide protection for the skin against erythemal response. In addition, a subclass of compounds, produces dihydroxyacetone or derivatives thereof upon exposure to sunlight, so as to produce a staining agent in relationship to the exposure to sunlight. Additionally, other heterocycles are provided which also produce the staining agent, dihydroxyacetone or its derivatives, and avoid the deficiencies of the use of dihydroxyacetone by itself.

DESCRIPTION OF THE SPECIFIC EMBODIMENTS

Method and compounds are provided which provide a suntan without erythemal response either by producing a skin tanning agent, particularly dihydroxyacetone, or O-alkylated derivatives upon exposure to light, so as to provide tanning without requiring extended exposure to sunlight, or by providing a sunscreening agent which absorbs the light at erythema producing wavelengths and optionally produces dihydroxyacetone or O-alkylated derivatives simultaneously.

The compounds which are employed are aromatic heterocyclic compounds undergoing an $n\pi^*$ or $\pi\pi^*$ transition to form an excited state, which when properly functionalized, produce dihydroxyacetone. Otherwise, the compounds absorb the light at wavelengths which cause an erythemal response, so as to allow for tanning while protecting from burning.

The compounds employed in this invention, will usually have from 7 to 30, more usually 10 to 24 carbon atoms, and at least two oxy groups, usually from 2 to 5 oxy groups bonded to a single aliphatic substituent of from 2 to 12 carbon atoms. There will be at least one heterocyclic ring. There will be at least one heteroannular member, either nitrogen or oxygen, usually from 1 to 2 heterocyclic annular members. In addition, there will be at least one aromatic ring, and when there are two rings, the rings will be fused. Preferably, the compound will have a chain or segment of a chain of three saturated carbon atoms, each of the three carbon atoms having an oxy substituent. One of the carbon atoms may have two oxy substituents.

Other than the oxyalkyl group(s), other substituents which may be present, include halo, particularly fluorine, chlorine and bromine (atomic number 9 – 35), oxy (hydroxy or hydrocarbyloxy of from 1 to 8 carbon atoms, more usually of from 1 to 2 carbon atoms), oxo (oxocarbonyl and non-oxocarbonyl, e.g., carboxy and alkoxycarbonyl of from 2 to 5 carbon atoms) and amino, including mono- or dihydrocarbylamino (particularly alkyl or dialkyl amino), wherein the hydrocarbyl groups are of from 1 to 8 carbon atoms, more usually of from 1 to 2 carbon atoms.

(Wherever hydrocarbyl is used, either by itself or in combination with a heterofunctionality, hydrocarbyl intends a monovalent hydrocarbon radical, consisting of carbon and hydrogen and may be aliphatic, alicyclic, aromatic or combinations thereof, e.g., aralkyl, and may be aliphatically saturated or unsaturated, e.g., ethylenic.)

The preferred nitrogen azaheterocyclic compounds are bicyclic fused aromatic compounds, having a nitrogen atom in the one position with the two carbon atom bonded to the polyoxyaliphatic group and having from 1 to 2 heteroannular nitrogen atoms.

For the most part, the azaheterocycles will have the following formula:

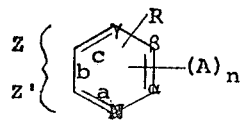

wherein:

α, β, and γ are CH or a nitrogen atom, not more than one of α, β, and γ being a nitrogen atom;

Z and Z' are bonded solely to carbon and are either hydrogen or may be taken together to form a butadienylene or azabutadienylene chain, so as to form a fused ring in the b or c position;

n is 0 to 2, more usually 0 to 1;

A is of from 0 to 12 carbon atoms, usually 0 to 8 carbon atoms and may replace any hydrogen on a ring (i.e., bonded to an annular carbon atom) and is alkyl of from 1 to 8, usually 1 to 3 carbon atoms; halo, particularly chlorine or bromine (atomic number 9 – 35); oxy (hydrocarbyloxy of from 1 to 8 carbon atoms, more usually of from 1 to 2 carbon atoms, or hydroxy); oxo, particularly nonoxocarbonyl, e.g., alkoxycarbonyl of from 2 to 7 carbon atoms, and the like; and R is of from 2 to 12 carbon atoms, more usually from 2 to 6 carbon atoms, and preferably 4 carbon atoms, and is polyoxyalkyl or polyoxyalkoxyalkyl having from 2 to 5 oxy groups, preferably 2 to 3 oxy groups wherein the oxy groups are hydroxyl or alkoxy of from 1 to 3 carbon atoms, particularly methoxy. Usually R will have an aliphatic chain or segment of a chain of 3 carbon atoms with an oxy group bonded to each carbon atom.

R groups include 2,3,4-trihydroxybutyl, 2,2-di(hydroxymethyl)-3-hydroxypropyl, 1,3-dihydroxypropyl-2-oxymethyl, 2,3-dihydroxypropyl-1-oxymethyl, 2,3-dihydroxy-2-hydroxymethylpropyl, 1,2,3,4,5-pentahydroxypentyl, 2,3,4,5,6-pentahydroxyhexyl, 2,2-di(methoxymethyl)-2-hydroxyethyl, 1,3-di(ethoxy)propyl-2-oxymethyl, 2,4-dimethoxy-3-hydroxybutyl and 2,3-dimethoxypropyl-1-oxymethyl.

The following azaheterocycles of this invention will have the following formula:

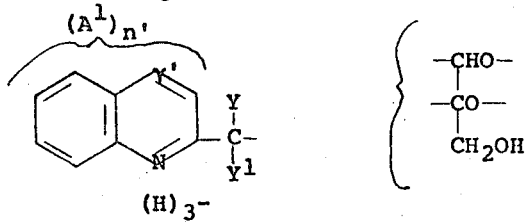

wherein:

three of the four free valences of the trioxypropyl group are satisfied by hydrogen and the remaining valence by the quinaldinyl radical;

Y and Y¹ are hydrogen, hydrocarbyl of from 1 to 8 carbon atoms, more usually of from 1 to 3 carbon atoms, particularly alkyl, e.g., methyl;

n' is an integer of from 0 to 2, more usually from 0 to 1;

A¹ is of from 0 to 12 carbon atoms, usually 0 to 6 carbon atoms, bonded to to an annular carbon atom, and is halo (atomic number 9 to 35), hydrocarbyl of from 1 to 12 carbon atoms, more usually of from 1 to 2 carbon atoms, particularly alkyl, or hydrocarbyloxy of from 1 to 6 carbon atoms, more usually of from 1 to 3 carbon atoms, particularly alkoxy; and γ' is CH or nitrogen, preferably CH.

Preferred compounds have Y and Y¹ as hydrogen or alkyl of from 1 to 3 carbon atoms, n' is 0 to 1, and A¹ as alkyl or alkoxy when n' is 1. Particularly preferred is when γ' is CH.

Illustrative compounds as the azaheterocycles include (DHM intends di(hydroxymethyl)) 2-(DHMmethoxymethyl)-quinoline; 2-(DHMmethoxymethyl)quinoxaline; 3-ethyl-2-(DHMmethoxymethyl) quinoxaline; 3-(DHMmethoxymethyl)-1,2-cinnoline; 2-(DHMmethoxymethyl)-4-methylquinoline; 2-(1'-methyl-1'-DHMmethoxymethyl)-8-methylquinoline; 2-(DHMmethoxymethyl-8-hexyloxyquinoline); 2-(α-(DHMmethoxy)benzyl-4-chloroquinoline); 2-(1'-DHMmethoxy-1'-methyl)ethyl quinoxaline; 2-(α-DHMmethoxy-α-(p-anisyl)methyl) quinoxaline; 2-(2'3'4'-trihydroxy-1'-butyl)quinoline; 1-(1',2',3'-trihydroxypropyl)isoquinoline and 2-(2'-hydroxy-2'-methoxymethyl-3'-methoxypropyl-1'quinoline.

Another group of compounds which are analogous to the azaheterocycles which produce dihydroxyacetone on exposure to sunlight have for the most part the following formula:

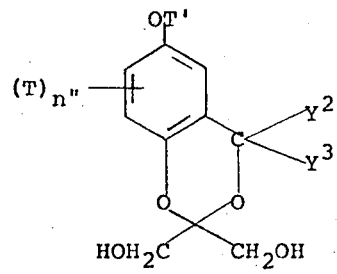

wherein:

Y² and Y³ are hydrogen (normally at least one being hydrogen), hydrocarbyl of from 1 to 12 carbon atoms, usually of from 1 to 8 carbon atoms, more usually of from 1 to 6 carbon atoms, particularly aromatic hydrocarbon, or substituted hydrocarbyl of from 1 to 12 carbon atoms, more usually of from 1 to 8 carbon atoms and having from 1 to 3, more usually from 1 to 2, heterosubstituents, with a total of from 1 to 4 heteroatom, which are halo (atomic number of 9 – 35) or oxy, usually hydrocarbyloxy, particularly alkoxy;

n" is an integer of from 0 to 2, more usually of from 0 to 1;

T is of from 0 to 12 carbon atoms and is hydroxyl halo (atomic number 9 – 35), hydrocarbyloxy of from 1 to 12 carbon atoms, more usually of from 1 to 6 carbon atoms, and particularly alkoxy of from 1 to 3 carbon atoms, or hydrocarbyl of from 1 to 12 carbon atoms, usually of from 1 to 8 carbon atoms, more usually of from 1 to 3 carbon atoms, and particularly alkyl;

T' is hydrogen or hydrocarbyl of from 1 to 12 carbon atoms, particularly free of aliphatic unsaturation, and usually alkyl of from 1 to 6 carbon atoms, more usually alkyl of from 1 to 3 carbon atoms.

Illustrative compounds which are benzodioxanes are as follows: (DHM intends dihydroxymethyl) 2,2-DHM- 4-phenyl-6-methoxy-1,3-benzodioxane; 2,2-DHM-4-(2',5'-dimethoxyphenyl)-6-methoxy-1,3-benzodioxane; 2,2-DHM-4-(3',4'-dimethoxyphenyl)-6-methoxy-1,3-benzodioxane; 2,2-DHM-4-(2',4'-dimethoxyphenyl)-6-methoxy-1,3-benzodioxane; 2,2-DHM-4-(4'-methoxyphenyl)-6-methoxy-1,3-benzodioxane; 2,2-DHM-4-(4'-fluorophenyl)-6-methoxy-1,3-benzodioxane; 2,2-DHM-4-(4-dodecyloxyphenyl)-6-methoxy-1,3-benzodioxane; 2,2-DHM-4-methyl-4-(p-phenethyl)-6-decyloxy-1,3-benzodioxane; 2,2-DHM-4-(3',4'-methylenedioxyphenyl)-6-hexyloxy-1,3-benzodioxane; 2,2-DHM-(-hydroxy-1,3-benzodioxane; and 2,2-DHM-4-(4'-tert.-butyloxyphenyl)-6-methoxy-8-methyl-1,3-benzodioxane.

Depending on the particular compounds to be prepared, various procedures may be used for their synthesis. For the azaheterocycles, for preparing the polyoxyalkyl derivatives, an appropriate metalloorganic compound can be prepared, for example, the lithium or Grignard derivative of the heterocycle or alkyl heterocycle and this compound condensed with an appropriate ketone. Normally, the hydroxyl groups will be protected by ether linkages. For the polyoxyalkoxyalkyl derivatives, the appropriate halomethyl heterocycle may be used which may be reacted with, for example, 5-hydroxy-1,3-dioxane (preferably, the 1,3-glycerol acetal of benzaldehyde will be employed). The 5-hydroxyl-1,3-dioxane will normally be employed as the alkoxide, e.g., sodium or lithium alkoxide.

For the benzodioxane compound, the appropriate orthohydroxymethylphenol is combined with a strong base and then treated with dihalomalonate ester, e.g., diethyl dibromomalonate. Upon reduction of the ester groups, the desired dihydroxymethyl substituted benzodioxane is obtained.

The following examples are offered by way of illustration and not by way of limitation.

(All temperatures, unless otherwise indicated are reported in Centigrade.)

EXAMPLE I 2,2-Dihydroxymethyl-6-methoxy-1,3-benzodioxane

A. A solution of 2-hydroxy-5-methoxybenzaldehyde (7.6 g) in benzene (50 ml) was added dropwise to 14 ml of a stirred 70 weight percent solution in benzene of sodioalumino-(dimethoxyethoxy)hydride at such a rate as to control the rate of reaction. At the end of the addition more hydride solution (2.0 ml) together with dry benzene (50 ml) was added and the mixture stirred at room temperature for one hour.

Saturated NH₄Cl (120 ml) was added and the mixture stirred vigorously. The solid which separated was filtered and the filter cake was dissolved in water by acidifying to a pH of 2 - 3 with concentrated HCl solution. The solution was extracted with methylene chloride and the methylene chloride solution dried with MgSO₄ and concentrated in vacuo leaving a brown oil which crystallized on standing. Recrystallization from benzene-pentane, gave 4.0 g. m.p. 78°-9°C.

B. A solution of 2-hydroxy-5-methoxybenzyl alcohol (1.54 g) in dry dimethyl formamide (DMF) (125 ml) was treated with sodium hydride (1.08 g, 50 weight percent in mineral oil). The color became yellow and the mixture was stirred one hour. Diethyl dibromomalonate (3.18 g) was added in one portion and the mixture stirred for four hours.

The reaction mixture was then poured into water and extracted with ether. The ether layer was washed with several portions of water, dried with MgSO₄ and concentrated to a yellow oil. The mineral oil was removed by partitioning between acetonitrile-pentane and the remaining product was purified by column chromatography on silica gel with ether-hexane, 1:4. The product is removed in the first fractions and is obtained as a yellow oil. The product weighed 0.6 g.

C. A solution of 2,2-dicarbethoxymethyl-6-methoxy 1,3-benzodioxane (0.621 g) in dry benzene (5 ml) was added dropwise over 5 – 10 minutes to a stirred solution of sodioalumino(dimethoxyethoxy)hydride (1.52 ml, 70 weight percent in benzene) in dry benzene (5 ml) while cooling in an ice bath. After the addition was complete, the mixture was stirred at ambient temperature for 2.5 hours, then poured into NaOH solution (75 ml, 20 weight percent) and the product extracted with ether. The ether was dried with MgSO₄ and concentrated leaving a colorless oil which crystallized on standing. Wt. 0.31 g. The product, crystallized from chloroform, had a melting point of 110°-111°.

EXAMPLE II 2,2-Dihydroxymethyl-4-phenyl-6-methoxy-1,3-benzodioxane

A. Phenyl magnesium bromide was prepared in the usual manner from bromobenzene (31.4 g) magnesium turnings (5 g) and ether (75 ml).

A solution of 2-hydroxy-5-methoxybenzaldehyde (15.2 g) in ether (200 ml) was added dropwise over a period of 45 minutes. The mixture was heated at reflux for 30 minutes, cooled at room temperature and poured into saturated NH₄Cl solution, while stirring vigorously. The organic layer was separated, dried with MgSO₄ and concentrated in vacuo to a yellow oil which crystallized on standing. Recrystallization from benzene gave 19.0 g, m.p. 105°-107° C.

B. A solution of 2-hydroxy-5-methoxybenzhydrol (2.3 g) in DMF (125 ml) was treated with sodium hydride (.108 g, 50 weight percent in mineral oil). The mixture was stirred for 15 minutes and then warmed at 60° for 30 minutes to insure complete formation of the dianion. Diethyl dibromomalonate (3.18 g) was added in one portion and the mixture stirred at ambient temperature for 2.5 hours, then poured into water (150 ml) and extracted with ether. The ether extract was washed with several portions of water and dried with MgSO₄ Concentration of the ether in vacuo and partitioning of the residue between acetonitrile/pentane gave the crude product as a yellow oil.

The product was purified via column chromatography on silica gel with chloroform and is removed in the first fractions.

Yield 2.5 g as a yellow oil

IR (Carbonyl 1750 cm⁻¹ liquid film

NMR agrees with the structure of the product.

C. A solution of 2,2-dicarbethoxy-4-phenyl-6-methoxy-1,3-benzodioxane (1.3 g) in dry benzene (10 ml) was added dropwise to a solution of sodioalumino-dimethoxyethoxyhydride (3.5 ml, 70 weight percent in benzene) dissolved in benzene (13 ml). The mixture was stirred for 2 hours and then poured into sodium hydroxide (50 ml, 20 weight percent) and extracted with ether. The ether was dried with MgSO₄ and concentrated in vacuo to yield a white crystalline product. Recrystallized from chloroform/pentane, m.p. 158°-160°.

Yield 0.5 g. NMR agrees with structure of the product.

Anal. Calcd. for $C_{17}H_{18}O_5$: C, 67.54; H, 6.00.

Found: C, 67.0; H, 6.0.

EXAMPLE III

Preparation of $O^2$-quinaldinyl glycerol

A. Crystalline 2-phenyl-1,3-dioxalan-5-ol (1.80 g, 10 mmoles) (prepared in the manner of N. Baggett, et al, J. Chem. Soc., 1960, 2574) and solid 50% sodium hydride (0.5 g, 10 mmoles) were placed in a flask, and degassed under vacuum. The flask was then repeatedly refilled with dry nitrogen and evacuated, followed by cooling in an ice bath. Precooled, dry dimethylformamide (20 ml) was rapidly added with magnetic stirring to the solid in the flask. The ice bath was removed as soon as the initial surge of gas evolution stopped and the mixture stirred at room temperature for one-half hour. At this time the solution-suspension was added dropwise by syringe to a freshly prepared and degassed solution of α-bromoquinaldine (2.22 g, 10 mmoles) in 10 ml of dry dimethyl formamide at 0° C. The α-bromoquinaldine was prepared in two steps after the fashion of F. L. Hammick, J. Chem. Soc., 1923, 2882; ibid., 1926, 1307.

After stirring 20 minutes at 0° and 20 minutes at room temperature, the solution was poured into 1 l. of an ice-water mixture. A light tan precipitate was collected by vacuum filtration and recrystallized from 95% ethanol to m.p. 129°–130° C. NMR, IR and UV spectra were as anticipated for the desired product.

Anal. Calcd. for $C_{20}H_{19}NO_3$: C, 74.75; H, 5.96; N, 4.36;

Found: C, 74.96; H, 6.02; N, 4.31.

B. A mixture of 7.5 g of 2-phenyl-5-(2-quinolinylmethoxy)-1,3-dioxane, 20 g of boric acid and 60 ml of 2-methoxyethanol was heated to reflux temperature and maintained at that temperature for one half hour. The solution was then cooled, diluted to 200 cc with water and extracted three times with 70 cc portions of ether. The aqueous solution was then saturated with sodium chloride and extracted with five 50 ml portions of methylene chloride. The combined methylene chloride extracts were dried over magnesium sulfate, filtered and concentrated to a yellow oil. This oil was freed of residual 2-methoxyethanol by prolonged evaporation on a rotary evaporator at 60°. The oil was then redissolved in a small amount of methylene chloride and ethyl ether was added to a cloud point. Standing in the cold, seeding or scratching gave a white crystalline solid. m.p. 84°–85°. NMR, IR, and UV were as expected for the desired product. Elemental analysis:

Anal. Calcd. for $C_{13}H_{15}NO_3$: C, 66.94; H, 6.48; N, 6.00.

Found: C, 67.03; H, 6.41; N, 5.85.

EXAMPLE IV

Preparation of Di(hydroxymethyl)methyl 3-methylquinoxalinyl-2-methyl ether

A. Crystalline 2-phenyl-1,3-dioxolan-5-ol (1.18 g, 4.2 mmoles) (prepared in the manner of N. Baggett, et al, supra) and solid 50% sodium hydride (0.2 g, 10 mmoles) were placed in a flask, and degassed under vacuum. The flask was then repeatedly refilled with dry nitrogen and evacuated, followed by cooling in an ice bath. To this solid, by means of a syringe, was added at once with magnetic stirring 10 ml of pre-cooled, dry DMF. The ice bath was removed as soon as the initial surge of gas evolution quieted and the mixture stirred at room temperature for one half hour. At this time, the solution-suspension was added dropwise by syringe to a freshly prepared and degassed solution of 2-bromomethyl-3-methylquinoxaline (1.0 g, 4.2 mmoles) in 4 ml of dry DMF at 0°. The bromomethyl compound was prepared in the manner of H. Simon, et al, Chem. Ber. 98, 3692 (1965). After stirring 20 minutes at 0° and 20 minutes at room temperature, the solution was diluted with 100 cc of ether and washed exhaustively with water. The ethereal solution was dried, filtered, and concentrated to a yellow brown oil. Crude product was not purified further.

B. A mixture of 1.8 g of the crude benzylidene glycerol derivative prepared above, 3.0 g of boric acid, and 10 cc of 2-methoxyethanol was heated to reflux temperature and maintained thus for one half hour. The solution was then cooled, diluted to 100 cc with water and extracted two times with 50 cc portions of ether. The aqueous solution was then saturated with sodium chloride and extracted with five 40 ml portions of methylene chloride. The combined methylene chloride extracts were dried, filtered and concentrated to a yellow oil. This oil was freed of residual 2-methoxyethanol by prolonged evaporation on a rotary evaporator at 60°. This oil was then passed through a short Florisil chromatography column with ether to give a colorless viscous oil which gave satisfactory NMR, IR and UV spectra for the desired product.

EXAMPLE V

Preparation of 2-(2′,3′-dihydroxy-2′-hydroxymethylpropyl-1′)quinoline

To a stirring solution of 2.9 g (20 mmoles) of quinaldine in 100 cc of dry ether, under a nitrogen atmosphere and cooled to −78° with acetone/dry ice, was rapidly added dropwise by syringe, 13 cc of a solution of butyl lithium (1.6 M) in hexane. An orange color formed instanteously with the addition of the butyl lithium. After one half hour at −78° a small amount of a crystalline precipitate appeared. To this suspension-solution was added dropwise by syringe a solution of 1 g (3.3 mmole) of dihydroxyacetone dibenzoate in 20 ml dry dioxane. The solution gradually changed in color from orange to light brown. After a half hour at −78°, the solution was allowed to warm to 0°, after which time saturated aqueous ammonium chloride was added to decompose any excess quinaldinyl lithium and to liberate the product.

The reaction mixture was washed four times with 25 ml portions of water in a separatory funnel, the aqueous washes combined, saturated with sodium chloride and extracted with five 30 cc portions of methylene chloride. The combined methylene chloride extracts were dried over anhydrous magnesium sulfate, filtered and concentrated to a brown viscous oil. After dissolving the oil in the minimum quantity of methylene chloride, hexane was added to the cloud point. Cooling and scratching of the solution gave 0.7 g of a white crystalline material. m.p. 89°–91° (96% of Yield).

The compounds of this invention may be formulated in any convenient vehicle for application to the skin. Any of the common readily available propietary toilet, cosmetic or medicinal cream bases, including synthetic cream bases, may be used in preparing compositions as creams. Usually the amount of the subject compound will be from about 0.5 to 25 weight percent, more usually from 1 to 20 weight percent, in an aqueous vehicle. Other hydroxylic media may be used such as lower alkanols, glycol monoether, etc. Materials present, other than the vehicles and sunscreens, will normally be present in fairly small amounts, namely from about 0.01 to about 10 weight percent.

Materials used in minor amounts as gel forming or wetting agents include polyethers, such as polyethylene glycol ether-fatty alcohol complex, carboxypolymethylene (Carbopol 940, Goodrich Chemical Co.) polyethylene glycol 600, polyoxyethylene sorbitan stearate, etc. Other materials which may be present usually in amounts of the order of from 0.5 to 5 weight percent, are methylpolysiloxane, sorbitan sesquioleate, lanolin, cetyl alcohol, propylene glycol, etc.

Also, additional sun screens may be present such as homomenthyl salicylate, isoamyl para-dimethylaminobenzoate, 2-methoxyethyl para-methoxycinnamic acid, 2-hydroxy-4-methoxybenzophenone, etc. These compounds are normally present in from about 0.1 to 10 weight percent, more usually from about 0.2 to 5 weight percent.

In addition, it may be desirable to have a buffer present so as to control the pH of the system. Normally, the pH will be in the range of from about 5 to 9.

The compounds of this invention may be formulated as solutions, aerosols, etc., the formulation following normal procedures for preparing sunscreen formulations. With an aerosol, water will be substituted by the aerosol carrier.

To demonstrate the activity of the subject compounds, the compound of Example III was formulated as a 5 weight percent solution in 95% ethanol and a small amount spread on a patch of skin. The applied and surrounding area of skin was irradiated with a mercury lamp with a 300 nm cutoff for 20 minutes. While the skin around the applied area was severely burned, the applied area had a mild tan coloration.

By employing the compounds of the subject invention, and irradiating the skin, either in sunlight or ultraviolet light, where there is sufficient intensity at wavelengths above about 290 nm, it was found that a desirable tan is rapidly achieved as compared to those areas of the skin which were not coated with the subject compounds. Therefore, tanning can occur rapidly to give a naturally appearing highlighted tan. Furthermore, with the nitrogen heterocyclic compounds a sunscreening effect was observed. Therefore, while the skin was tanned, it was protected from erythemal response.

Thus, compounds of the subject invention avoid the inadequacies of employing a staining agent, such as dihydroxyacetone. Furthermore, the azaheterocyclic compounds provided excellent sunscreen protection.

Although the foregoing invention has been described in some detail by way of illustration and example for purposes of clarity of understanding, it will be obvious that certain changes and modifications may be practiced within the scope of the appended claims.

What is claimed is:

1. A compound of the formula:

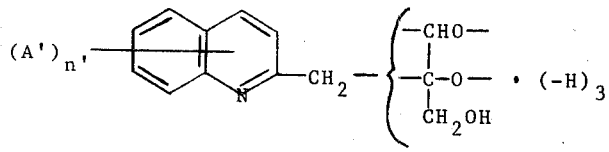

wherein 3 of the 4 free valences of the trioxypropyl are satisfied by hydrogen, and the remaining valence by quinaldinyl;
   n' is 0, 1 or 2; and
   A' is F, Cl Br, alkoxy of from 1 to 6 carbon atoms, or primary or secondary alkyl of from 1 to 6 carbon atoms.

2. A compound according to claim 1 which is O$^2$-(2'-quinolinylmethyl) glycerol.

* * * * *